(12) United States Patent
Rollman

(10) Patent No.: US 8,598,819 B2
(45) Date of Patent: Dec. 3, 2013

(54) MOTOR CONTROL

(75) Inventor: Charles Rollman, Colorado Springs, CO (US)

(73) Assignee: Analogic Corporation, Peabody, MA (US)

( * ) Notice: Subject to any disclaimer, the term of this patent is extended or adjusted under 35 U.S.C. 154(b) by 607 days.

(21) Appl. No.: 12/769,992

(22) Filed: Apr. 29, 2010

(65) Prior Publication Data

US 2011/0266982 A1 Nov. 3, 2011

(51) Int. Cl.
*H02P 3/14* (2006.01)
*H02P 3/18* (2006.01)

(52) U.S. Cl.
USPC ...... 318/376; 318/139; 318/400.02; 318/432; 318/434

(58) Field of Classification Search
USPC ............... 318/376, 139, 400.02, 432–434
See application file for complete search history.

(56) References Cited

U.S. PATENT DOCUMENTS

| 6,301,136 | B1 * | 10/2001 | Huggett et al. | 363/95 |
| 6,940,251 | B1 * | 9/2005 | Sarlioglu et al. | 318/721 |
| 7,034,475 | B2 * | 4/2006 | Kato et al. | 318/139 |
| 7,193,383 | B2 * | 3/2007 | Sarlioglu et al. | 318/438 |
| 7,508,147 | B2 * | 3/2009 | Rastogi et al. | 318/376 |
| 2009/0243522 | A1 * | 10/2009 | Suhama et al. | 318/376 |
| 2010/0192788 | A1 * | 8/2010 | Tanaka et al. | 100/214 |

OTHER PUBLICATIONS

Copley Controls Corp., What is 'Field Oriented Control' and what good is it?, 2002, http://www.copleycontrols.com/motion/pdf/Field-Oriented-Control.pdf.

* cited by examiner

*Primary Examiner* — Erick Glass

(74) *Attorney, Agent, or Firm* — Driggs, Hogg, Daugherty & Del Zoppo Co., LPA

(57) ABSTRACT

A system includes a power supply output sensor that senses an output level of a power supply during active motor control of a motor using the power supply and generates a signal indicative thereof. The motor regenerates energy and the power supply absorbs energy regenerated by the motor. The system also includes a motor controller that, in response to the signal satisfying a predetermined threshold, controls an electrical current supplied to the motor for active control of the motor based on a set of instructions that mitigate increases in the output level of the power supply from the absorption of the energy regenerated in the motor.

20 Claims, 4 Drawing Sheets

MOTOR CONTROL

TECHNICAL FIELD

The following generally relates to motor control and is described herein with particular application to managing regenerated energy in connection with a motor.

BACKGROUND

A motor is a machine that converts one form of energy to another form of energy. An electric motor converts electrical energy into mechanical energy or, occasionally, the reverse. By way of example, electrical energy supplied by a power supply to an electric motor has been used to accelerate, maintain a speed of, and/or decelerate a rotating shaft of the motor. The rotating shaft may be used for various applications such as rapidly decelerating a moving object having significant stored inertial energy or a heavy load that is being lowered against gravity and has significant stored potential energy. During active motor control, the motor may behave as a generator, and stored or potential energy from the motor may be converted back into electrical energy (regenerated energy) that is absorbed by the power supply.

A motor drive is the device that manages the application of electricity from a power supply to a motor in such a way as to achieve a desired motion. A conventional motor drive behaves like a bidirectional energy pump, transferring energy from the power supply into the motor to cause acceleration and from the motor to the power supply to cause deceleration. It does this irrespective of the relative voltages at the power supply and the motor. Generally, the power supply and the motor drive have a limiting maximum voltage. Exceeding this limit may result in damage to the power supply and/or the drive. With a power supply that is predominantly capacitive, the power supply voltage has a tendency to increase as the power supply absorbs regenerated energy. Unless somehow constrained, the voltage can increase above the limiting maximum voltage due to absorbed regenerated energy.

One approach to limiting the increase in power supply voltage during motor regeneration is to include a mechanism that opens the electrical path between the power supply or drive and the motor when the power supply voltage reaches a preset overvoltage threshold. This protects the power supply and drive by interrupting the regeneration process before power supply voltage can reach a damaging level, but it also results in a cessation of active motor control (i.e., the motor drive no longer controls the motor), and the motor coasts until the power supply voltage decays to an acceptable level where active motor control can resume. Generally, the loss of active motor control is undesirable, and repetition of this cycle may cause a chugging behavior as the drive enables and disables. Another approach would be to increase system mechanical losses. Still another approach would be to use a mechanical brake.

Yet another approach includes using a regenerative energy dissipator. With this approach, when power supply voltage increases and approaches the overvoltage threshold due to the absorption of motor regenerated energy, a large resistor is switched into the circuit across the power supply so as to partially discharge the bulk capacitance and limit the voltage increase to acceptable levels. The regenerative energy dissipator removes excess energy from the power supply and dissipates it as heat in a resistor. With sufficient regenerative energy dissipation, motor control can continue without limit, even during rapid deceleration or lowering of heavy objects, because the power supply voltage is not allowed to reach damaging levels. Regenerative energy dissipators work well to manage the energy recovered from the motor. However, they come at the expense of added circuit and system complexity, size, and cost.

This added expense may be hard to justify in smaller and less expensive motor drive products. Furthermore, some mechanical systems using motor drives may not need to manage large amounts of regenerated energy, for example, where deceleration rates are limited and friction losses significant so that only a modest power needs to be removed from the motor via the drive in order to achieve acceptable deceleration performance. Also, the power supply and drive may be designed with a relatively large tolerance for voltage and with a relatively large capacitance so that the impact of regenerated energy is moderated. In such applications, the full capability of a regenerative energy dissipator is overkill given the relatively small amount of regenerated energy that needs to be managed.

SUMMARY

Aspects of the application address the above matters, and others.

In one aspect, a system includes a power supply output sensor that senses an output level of a power supply during active motor control of a motor using the power supply and generates a signal indicative thereof. The motor regenerates energy and the power supply absorbs energy regenerated by the motor. The system also includes a motor controller that, in response to the signal satisfying a predetermined threshold, controls an electrical current supplied to the motor for active control of the motor based on a set of instructions that mitigate increases in the output level of the power supply from the absorption of the energy regenerated in the motor.

In another aspect, a method decreasing a torque producing efficiency of a motor based on an output level of a power supply supplying power for driving the motor.

In another aspect, a method includes maintaining an output voltage of a power supply used to drive a motor under a predetermined maximum voltage limit by reducing an amount of a torque producing component of an electrical current supplied to the motor to drive the motor as the output voltage of the power supply increases towards a predetermined voltage limit.

BRIEF DESCRIPTION OF THE DRAWINGS

The application is illustrated by way of example and not limitation in the figures of the accompanying drawings, in which like references indicate similar elements and in which.

DETAILED DESCRIPTION

Figure 1:
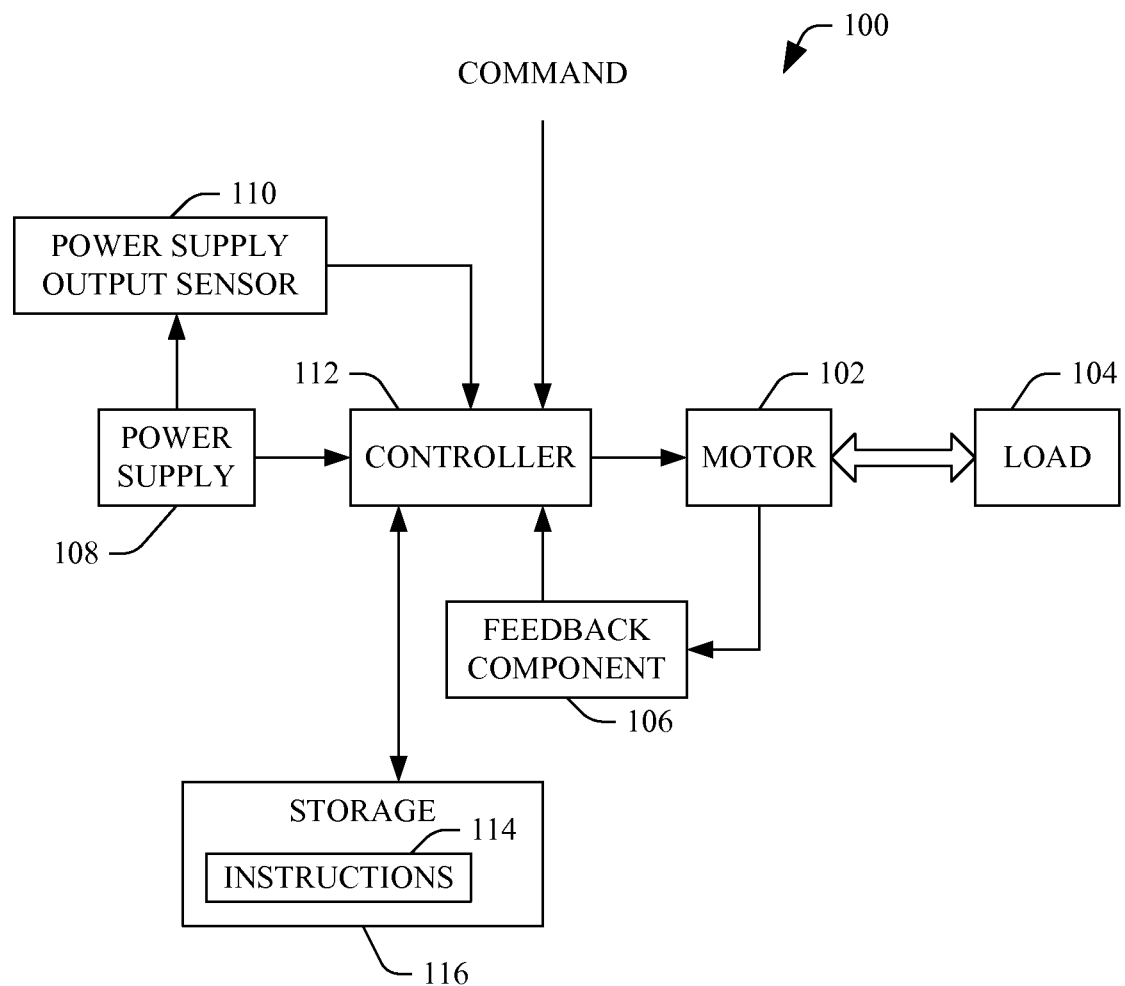
FIG. 1 illustrates an example system that includes a motor that regenerates energy and a power supply that absorbs regenerated energy.

FIG. 1 illustrates an example system 100.

The system includes a motor 102 that converts one or more electrical signals (e.g., electrical current, voltage, power, etc.) into mechanical energy that drives a load 104. Suitable motors, include, but are not limited to, a brushless DC (direct current) motor, a stepper motor, a linear motor, an induction motor, and/or other motor that regenerates energy.

A motor feedback component 106 senses an electrical state (s) (e.g., current, voltage, or power) of the motor 102 and generates a signal indicative thereof. The feedback component 106 may also sense a positional state of the rotating part of the motor 102.

A power supply 108 supplies the power used to accelerate, maintain a speed of, and decelerate the motor 102. The illustrated power supply 108 may absorb energy regenerated by the motor 102. A power supply output sensor 110 senses an electrical state of the output of the power supply 108 and generates a signal indicative thereof.

A motor controller or drive 112 governs and supplies an operating electrical signal (e.g., current, voltage, or power) to the motor 102. In the illustrated embodiment, the motor controller 112 generates the signal based on various inputs, including, but not limited to, an input command signal (e.g., that indicates a predetermined torque of interest), the motor electrical and mechanical state feedback signal, the power supply electrical state feedback signal, operating instructions 114 in storage 116, and/or other information. The illustrated operating instructions 114 include at least one or more sets of motor instructions.

Generally, the power supply 108 and/or the drive 112 have a maximum voltage limit. As described in greater detail below, in one non-limiting embodiment, the controller 112 concurrently controls the motor 102 and mitigates absorption of motor regenerated energy by the power supply 108 during active motor control. This may facilitate mitigating an overvoltage condition of the power supply 108 (e.g., a voltage in excess of a maximum voltage of the power supply 108) due to the absorption of regenerated power. Other circuitry such as a regenerative energy dissipator, a switch that opens the electrical path to the motor 102, a mechanical brake, and/or other circuitry may additionally be utilized.

For sake of brevity and explanatory purposes, the foregoing is now described in greater detail in connection with a three-phase brushless DC motor and field oriented control. However, as noted herein, other motors such as a stepper motor, a linear motor, an induction motor, and/or other motor are also contemplated herein.

Figure 2:
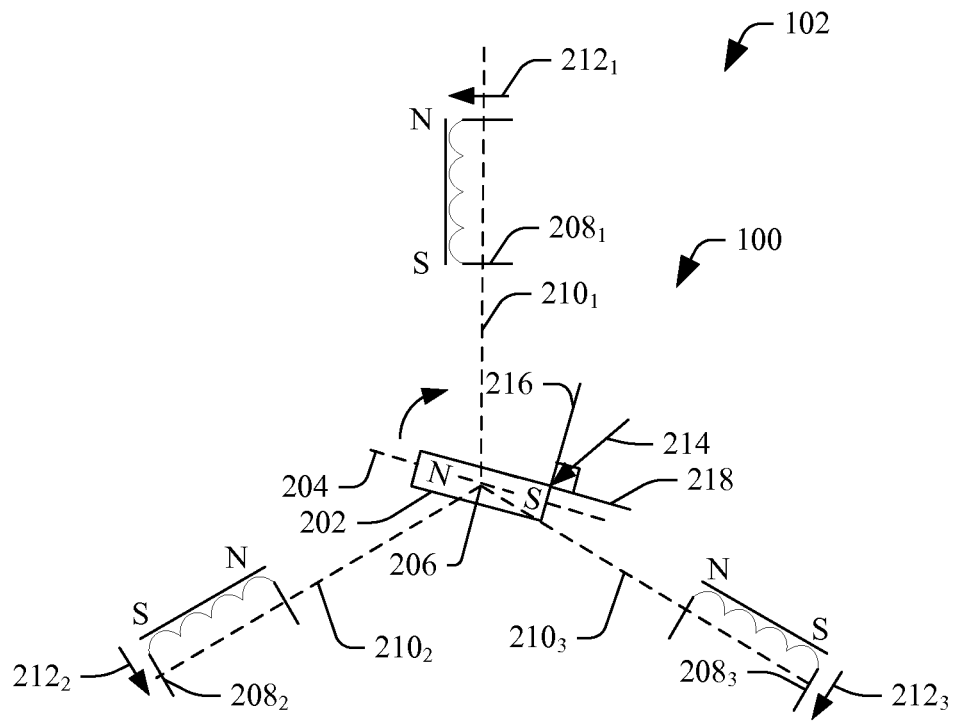
FIG. 2 illustrates an example representation of a rotor and stator of a brushless DC motor and corresponding magnetic fields.

Turning to FIG. 2, an example representation of a rotor and a stator of a servo brushless DC motor 102 is illustrated.

The rotor is represented through a permanent magnet 202 having north (N) and south (S) poles. The magnet 202 has a longitudinal axis 204 and is configured for rotation about a rotation or central axis 206, which is perpendicular to the longitudinal axis 204.

The stator is represented by three equally spaced windings $208_1$, $208_2$, and $208_3$, which are fixed with respect to the magnet 202 and surround the magnet 202. The illustrated windings are spaced one hundred and twenty (120) degrees apart from each other respectively along axes $210_1$, $210_2$, and $210_3$.

Current flow $212_1$, $212_2$, and $212_3$ in each of the windings $208_1$, $208_2$, and $208_3$ produces respective magnetic field vectors that sum to produce a net stator magnetic field 214. The net magnetic field 214 has an orthogonal (or quadrature) component 216, with respect to the magnet longitudinal axis 204, and a parallel (or direct) component 218, with respect to the magnet longitudinal axis 204. The quadrature component 216 exerts a torque producing force on the magnet 202, and the direct component 218 exerts a force that is in line with or parallel to the magnet axis 204 and that does not produce torque.

By controlling currents in the windings $208_1$, $208_2$, and $208_3$, a net stator magnetic field 214 having a predetermined direction and magnitude can be produced by the stator windings $208_1$, $208_2$, and $208_3$ for a given torque of interest. Generally, the torque is produced by the attraction or repulsion between this net stator magnetic field 214 and the magnet 202 magnetic field. For each angular position of the magnet 202, there is a direction of the net stator magnetic field 214 at which maximum torque is produced, and there is a direction of the net stator magnetic field 214 at which no torque is produced.

When the net stator magnetic field 214 is orthogonal to the magnetic axis 204, there is no direct component 218 and the magnetic force from the quadrature component 216 turns the magnetic 202 and maximum torque is produced. When the direction of the net stator magnetic field 214 is parallel with the magnetic axis 204, there is no quadrature component 216 to turn the magnet 202 and no torque is produced, even though a force is applied in line with the magnet axis 204. For angles between zero (0) and ninety (90) degrees relative to the magnetic axis, the amount of torque corresponds to the ratio of the quadrature component 216 to the direct component 218.

With field oriented control, the above can be expressed in terms of winding electrical currents (or current space vectors) rather than winding magnetic fields. This is illustrated in FIG. 3, which includes the three stator winding axes $210_1$, $210_2$, and $210_3$ of FIG. 2 and stator X and Y axes 310 and 312.

Figure 3:
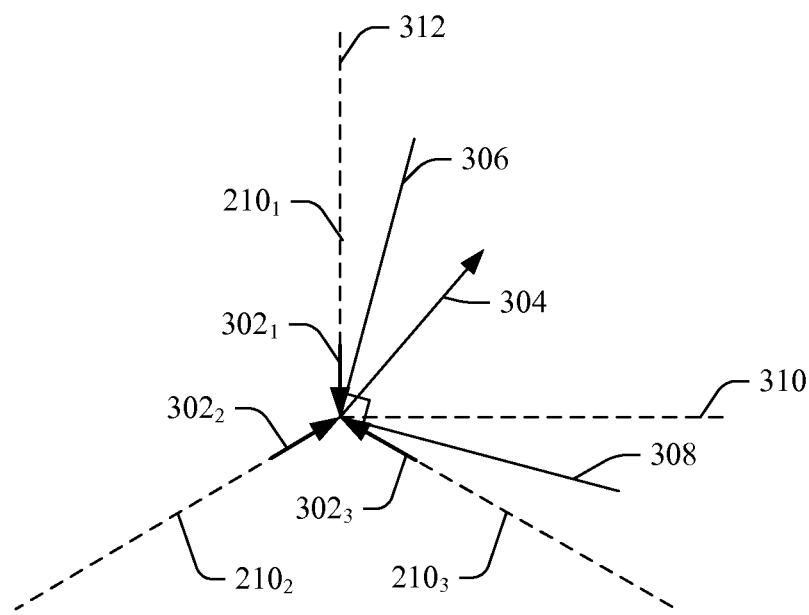
FIG. 3 illustrates an example representation of stator current vectors of the brushless DC motor of FIG. 2, including a net current vector and orthogonal and parallel components thereof.

As shown in FIG. 3, stator current space vectors $302_1$, $302_2$, and $302_3$ respectively corresponding to the winding $208_1$, $208_2$, and $208_3$, have a direction of the field produced by the corresponding winding and a magnitude proportional to the current through that winding. As such, the net stator magnetic field 214 (FIG. 2) can be represented as a net current space vector 304 that is a vector sum of current space vectors $302_1$, $302_2$, and $302_3$.

Similar to the net stator magnetic field 214, the net current space vector 304 includes a quadrature (current vector) component 306 and a direct (current vector) component 308, respectively representing ninety (90) and zero (0) degrees with respect to the rotating magnetic field of the rotor. The quadrature and direct components 306 and 308 sum together to produce the net current space vector 304. Likewise, the quadrature current component 306 produces torque and the direct current component 308 does not.

Returning to FIG. 1, and with further reference to FIGS. 1-3, in one non-limiting embodiment, the instructions 114 include field oriented based algorithms.

For instance, where the power supply voltage is less than a predetermined overvoltage threshold, a non-limiting suitable algorithm would minimize the direct current vector component 308 (e.g., since it does not produce torque for rotating the magnet 202) and maximize the quadrature current vector component 306 (e.g., since it produces the torque for rotating the magnet 202). The torque will be maximum when there is no direct current vector component 308 and proportional to the magnitude of the net current space vector.

The stator current space vector 304 can be held substantially constant in magnitude and turned with the rotor magnet 202 so as to be in the quadrature direction, irrespective of rotor angle and speed. By way of example, the three motor currents can be continually adjusted so that the resulting quadrature current component responds to the desired torque and the direct current component is zero. Because the currents in the motor windings then contribute solely to the torque producing quadrature current vector component, the result is highly efficient motion with substantially constant and smooth torque.

For instances where the power supply voltage approaches and/or reaches the predetermined overvoltage threshold, one non-limiting suitable algorithm would lead the motor controller 112 to control the quadrature and direct current vector components 306 and 308 of the net current vector 304 based at least in part on the signal indicative of the sensed power supply output. Recall that regenerated energy may be absorbed by the power supply 108, which may increase the voltage of the power supply 108, potentially beyond the maximum voltage of the power supply 108. Torque (or force times speed) is energy flow. When speed and torque are both the same sign, energy/power flows into the motor's load. However, when speed and torque are different signs, then energy/power flows backwards towards the power supply.

As such, a suitable algorithm might may gradually or abruptly decrease the quadrature current vector component 306 and gradually increase the direct current vector component 308 (or rotate the net current vector from 90 degrees to 0 degrees) in response to increasing power supply voltage above a predetermined threshold. As a result, torque production efficiency decreases and the electrical current supplied to the motor 102, for a given torque, increases to compensate for torque loss. As current supplied to the motor 102 increases, power losses in the motor 102 and the motor controller 112 increase. These added losses tend to draw down the power supply 108 output.

With a quadrature current vector component 306 of zero, the net current vector 304 only includes a contribution from the direct current vector 308 and no torque is produced; the motor 102 would produce only heat due to its resistive losses and no further regenerative energy will be produced by the motor 102. Thus, as energy regeneration pushes the power supply 108 output towards its maximum limit, further increases in power supply voltage due to regenerated energy can be mitigated by rotating the net current vector 304, and the motor 102 can continue to be actively controlled, albeit with decreased efficiency.

Figure 4:
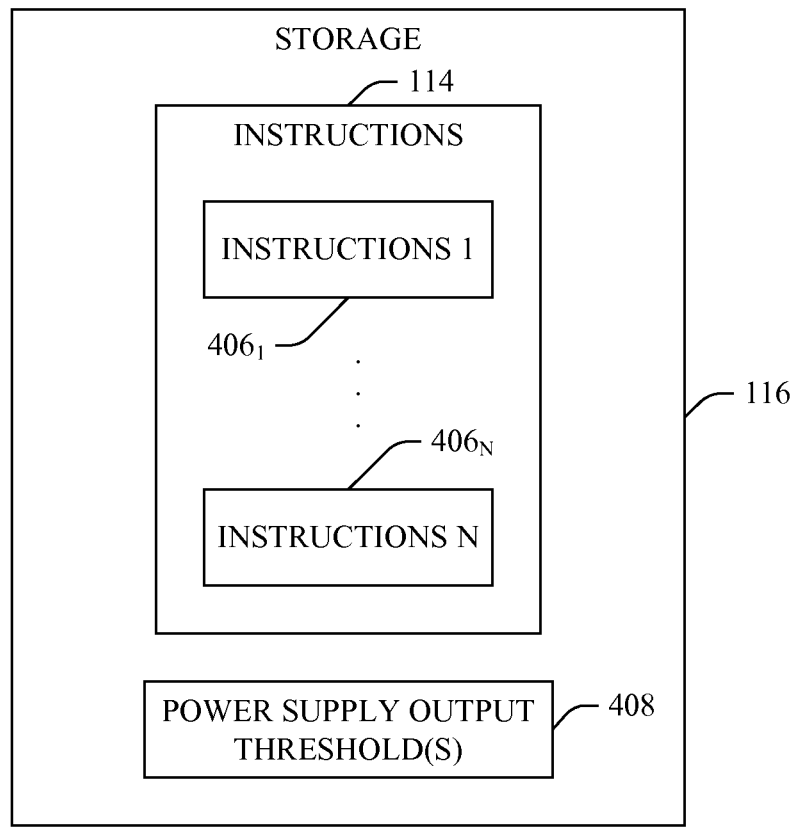
FIG. 4 illustrates example motor controller instructions.

FIG. 4 shows example non-limiting instructions 114. The illustrated instructions 114 include a first set of instructions $406_1$ that are utilized when the sensed power supply output is less than a power supply output threshold 408 and an Nth set of instructions $406_N$ (wherein N is an integer equal or greater than one (1)) that are utilized when the sensed power supply output satisfies the threshold 408. A comparator or other component can be used to compare the sensed output and the threshold 408 and generate a signal indicating which is greater (or smaller). The instructions 114 can be implemented in firmware, software, etc.

In one instance, the first set of instructions $406_1$ instructs the controller 112 to maximize the quadrature current vector component 306 and minimize the direct current vector component 308 (FIG. 3) for a given torque. In one embodiment, this means the net current vector 304 is rotated to ninety degrees and direct current vector component 308 is driven to zero. As noted above, such control maximizes motor 102 and torque production efficiency. Of course, suitable first instructions $406_1$ and/or other instructions 114 may otherwise instruct the controller 112.

The Nth set of instructions $406_N$ instructs the controller 112 to controllably increase the direct current vector component 308 of the net current vector 304 (while maintaining or reducing the quadrature current vector component 306) based on sensed power supply output above or in excess of the threshold 408. For example, when the supply voltage exceeds the threshold 408, the net current vector 304 is rotated from ninety degrees and towards zero degrees, for example, proportionately to the excess amount.

As discussed herein, motor torque production efficiency decreases as the direct current vector component 308 increases. However, with energy regeneration approaching the threshold 408, maintaining active motor control may be more desirable than the efficiency of the motor 102 and the controller 112. In such instance, system power losses can be leveraged to dissipate and mitigate regenerated energy for active acceleration or deceleration.

Note that in one embodiment the threshold 408 is set high enough that it can only be reached as a result of regeneration and not as a result of power line variations, for example. Also note that the rotation of the net current vector 304 may be linear or non-linear.

Figure 5:
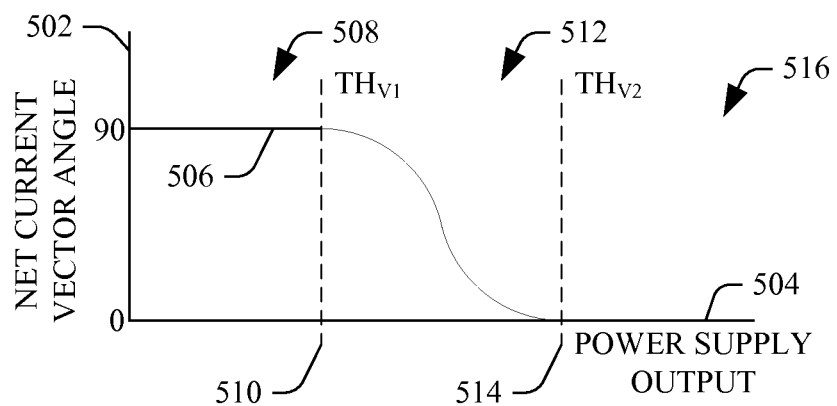
FIG. 5 illustrates an example curve illustrating the orthogonal component of the net current vector as a function of a level of the power supply output.

FIG. 5 shows an example relationship between the angle of the net current vector 304 and the power supply output. The y-axis 502 represents the angle of the net current vector 304 and the x-axis 504 represents the power supply output.

As shown, a curve 506 representing the net current vector includes a substantially flat region 508 corresponding to a region where the power supply output is below a first voltage threshold level ($TH_{V1}$) 510. In region 512, the power supply output satisfies the first voltage threshold ($TH_{V1}$) 510 and the curve 506 non-linearly (e.g., monotonically) decreases from ninety (90) degrees to zero (0) degrees with an increasing power supply output.

At second voltage threshold ($TH_{V2}$) 514, the net current vector decreases to zero (0) (e.g., no quadrature component). In one instance, the second voltage threshold ($TH_{V2}$) 514 corresponds to a maximum output limit of the power supply 108. In this manner, an overvoltage situation can be avoided. In region 516, electrical current is still supplied to the motor 102, however, the net current vector remains at zero (0) degrees and no further regenerated energy is produced.

Gradually rotating the net current vector 304 as the power supply output increases above the voltage threshold level ($TH_{V1}$) 510 may result in relatively smooth (no abrupt changes in) motor behavior while counteracting further increase in the power supply output. The motor just gradually looses its ability to produce torque as the power supply output increases towards the maximum limit. At the same time, system losses increase and tend to counteract the regeneration process. Although, the net current vector 304 can be abruptly rotated, if desired.

As the power supply output decreases in a direction below the voltage threshold level ($TH_{V1}$) 510, the curve 506 can be followed to rotate the net current vector back towards ninety (90) degrees. In another instance, a different curve is followed to rotate the net current vector back towards ninety (90) degrees as the power supply output decreases in a direction below the voltage threshold level ($TH_{V1}$) 510. In another embodiment, the shape of the curve 506 may be different. Furthermore, there may be more or less thresholds, and one or more thresholds may correspond to a different or similar level of the power supply output.

Figure 6:
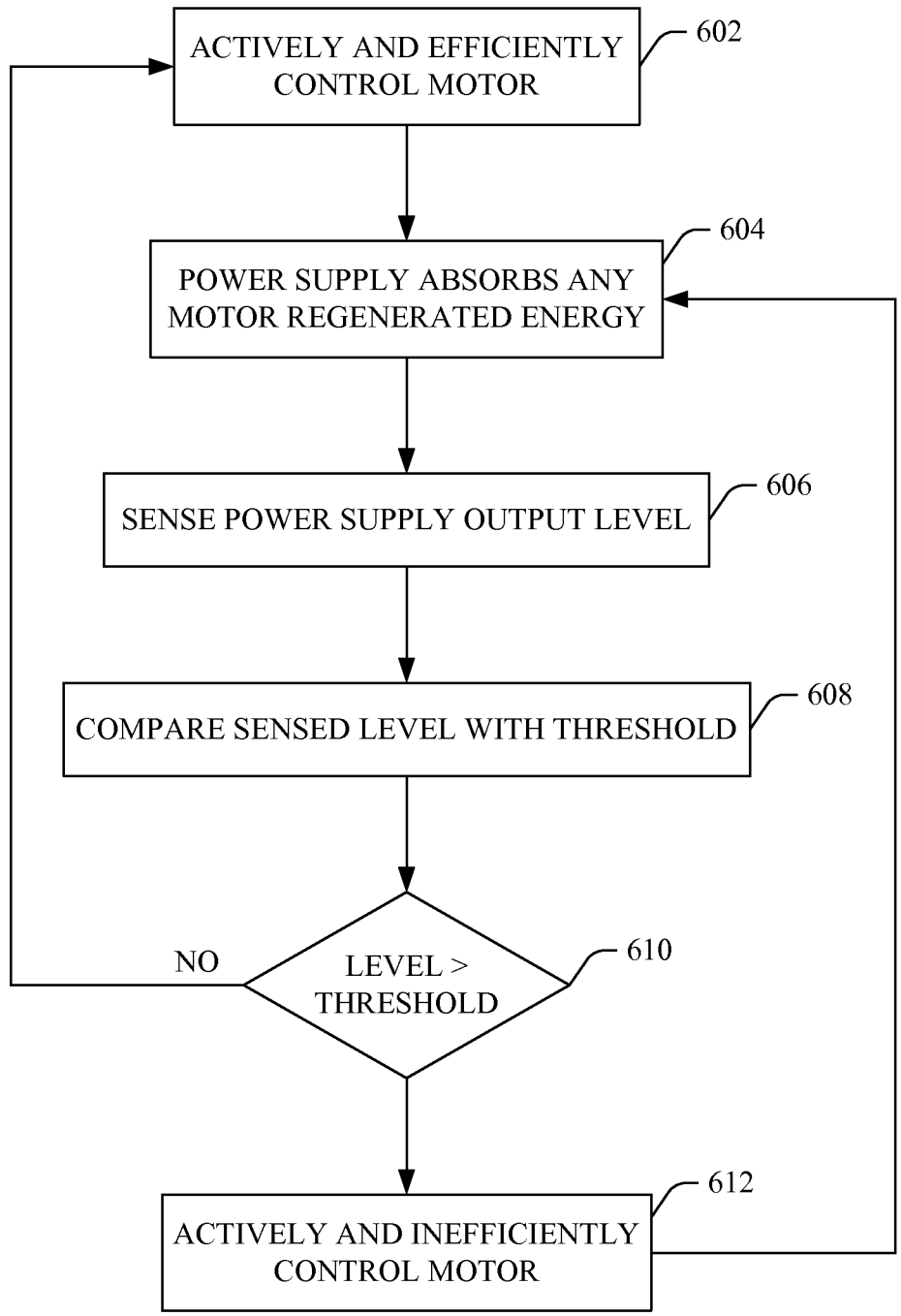
FIG. 6 illustrates an example method.

FIG. 6 illustrates a method for controlling production and/or absorption of motor regenerative energy.

It is to be understood that the ordering of the following acts is for explanatory purposes and not limiting. As such, different ordering, including concurrently performed acts, is contemplated herein. In addition, one or more of the following acts may be omitted and/or one or more acts may be included.

At 602, a motor controller 112 actively and efficiently controls the motor 102 using power from the power supply 108.

As described herein, in the context of field oriented control, the motor controller 112 controls the quadrature and direct current vector components 306 and 308 of the net current vector 304 to controllably produce torque. In this embodiment, the controller 112 efficiently controls the motor 102 by maximizing the quadrature current vector component 306.

At 604, energy regenerated by the motor 102 is absorbed by the power supply 108, which increase the power supply output voltage.

At 606, the power supply output is sensed and a signal indicative thereof is generated.

At 608, the power supply output is compared to a predetermined threshold voltage.

At 610, if the power supply output is less than the threshold, then acts 602-610 are repeated.

Otherwise, at 612, the motor controller 112 inefficiently but actively controls the motor 102, and acts 604-610 are repeated. The decreased efficiency causes some of the excess energy in the system to be dissipated as heat in the drive and/or motor.

As described herein, in the context of field oriented control, this may include rotating the net current vector 304 towards zero degrees, which may result in system power losses that facilitate reducing power supply output increases due to absorption of regenerative energy and/or mitigating regeneration of energy by the motor 102 (i.e., no torque production) while actively controlling the motor, and therefore incurring resistive losses in, the motor 102.

The regenerative energy mitigation discussed herein may be applied with various applications. An example of such application includes, but is not limited to, an application in which a load is rapidly decelerated. This may include decelerating a spinning printing drum, slowing down a moving antenna or moving an antenna in the presence of wind, lowering an object in the presence of gravity, moving a semiconductor wafer from one processing station to a next procession station, decelerating a disk drive, opening and closing a cover for an observatory, and/or other applications. Another example includes an application in which a heavy load is moved.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A system, comprising:
a power supply output sensor that senses an output level of a power supply during active motor control of a motor using the power supply and generates a signal indicative thereof, wherein the motor regenerates energy and the power supply absorbs energy regenerated by the motor; and
a motor controller that, in response to the signal satisfying a predetermined threshold, controls an electrical current supplied to the motor for active control of the motor based on a set of instructions that mitigate increases in the output level of the power supply from the absorption of the energy regenerated in the motor, wherein the motor controller controls a net electrical current vector of the supplied electrical current by rotating the net current vector to increase a direct current vector component of the net current vector and increase power losses in the motor.

2. The system of claim 1, wherein the motor controller controls the electrical current to mitigate energy regeneration by the motor.

3. The system of claim 1, wherein the motor controller controls the electrical current to increase power losses in the system.

4. The system of claim 3, wherein the power losses counteract increases in the output of the power supply from the absorption of the energy regenerated in the motor.

5. The system of claim 1, wherein the motor includes a stator and a rotor, and the motor controller rotates the net electrical current vector between ninety degrees and zero degrees, with respect to a rotating magnetic field of the rotor, based on the signal.

6. The system of claim 5, wherein rotating the net electrical current vector towards zero degrees reduces production of regenerated energy by the motor.

7. The system of claim 1, wherein the motor controller increases the direct component while maintaining a quadrature component of the net current vector.

8. The system of claim 1, wherein the motor controller further decreases a quadrature component of the net current vector.

9. The system of claim 1, wherein the motor controller controls the net electrical current vector so that there is a non-zero direct current vector component during active motor control.

10. The system of claim 1, wherein a value of a magnitude of the net current vector is maintained by rotating the new current vector.

11. The system of claim 1, wherein the net current vector is non-linearly rotated.

12. The system of claim 1, wherein the motor controller controls the electrical current supplied to the motor so that no torque is produced by the motor during at least a sub-portion of active motor control while electrical current is being supplied to the motor.

13. The system of claim 1, wherein the motor controller controls the electrical current supplied to the motor so that less than a maximum torque is produced by the motor during at least a sub-portion of active motor control while electrical current is being supplied to the motor.

14. A method, comprising:
decreasing a torque producing efficiency of a motor based on an output level of a power supply supplying power for driving the motor, wherein the torque producing efficiency is decreased by rotating a net current vector driving the motor towards zero degrees in a range of ninety to zero degrees increasing a parallel current vector component the net current vector and power losses in the motor.

15. The method of claim 14, wherein the torque producing efficiency decreased in response to the output level reaching or exceeding a predetermined output threshold.

16. The method of claim 14, wherein the net current vector further includes an orthogonal current vector component, and the net current vector is decreased by reducing a contribution of the orthogonal current vector component.

17. The method of claim 14, wherein the net current vector decreases as the power supply absorbs energy regenerated by the motor.

18. The method of claim 14, wherein decreasing the torque producing efficiency increases system power losses.

19. The method of claim 14, further comprising:
increasing the torque producing efficiency of the motor based on the output level of the power supply supplying power for driving the motor.

20. A method, comprising:
  decreasing a torque producing efficiency of a motor based on an output level of a power supply supplying power for driving the motor by rotating a net current vector of the motor to increase a direct current vector component of the net current vector and increase power losses in the motor as the power supply absorbs energy regenerated by the motor.

* * * * *